United States Patent
Feneyrou et al.

(10) Patent No.: US 11,125,879 B2
(45) Date of Patent: Sep. 21, 2021

(54) METHOD FOR PROCESSING A SIGNAL ARISING FROM COHERENT LIDAR AND ASSOCIATED LIDAR SYSTEM

(71) Applicant: THALES, Courbevoie (FR)

(72) Inventors: Patrick Feneyrou, Igny (FR); Grégoire Pillet, Elancourt (FR)

(73) Assignee: THALES, Courbevoie (FR)

( * ) Notice: Subject to any disclaimer, the term of this patent is extended or adjusted under 35 U.S.C. 154(b) by 341 days.

(21) Appl. No.: 16/325,705

(22) PCT Filed: Aug. 21, 2017

(86) PCT No.: PCT/EP2017/070994
§ 371 (c)(1),
(2) Date: Feb. 14, 2019

(87) PCT Pub. No.: WO2018/036946
PCT Pub. Date: Mar. 1, 2018

(65) Prior Publication Data
US 2019/0204441 A1   Jul. 4, 2019

(30) Foreign Application Priority Data
Aug. 23, 2016 (FR) ....................... 1601251

(51) Int. Cl.
*G01C 3/08* (2006.01)
*G01S 17/34* (2020.01)
(Continued)

(52) U.S. Cl.
CPC ............ *G01S 17/34* (2020.01); *G01S 7/4818* (2013.01); *G01S 7/493* (2013.01); *G01S 7/4917* (2013.01); *G01S 17/58* (2013.01)

(58) Field of Classification Search
CPC ........ G01S 17/34; G01S 17/58; G01S 7/4917; G01S 7/493; G01S 7/4818
(Continued)

(56) References Cited

U.S. PATENT DOCUMENTS

2007/0273863 A1\* 11/2007 Leep ................. G01S 7/497
356/5.15
2016/0131742 A1\* 5/2016 Schoor .............. H01Q 25/00
342/128

FOREIGN PATENT DOCUMENTS

EP   2 618 179 A1   7/2013
FR   3 034 189 A1   9/2016

OTHER PUBLICATIONS

Amzajerdian, et al., "Lidar systems for precision navigation and safe landing on planetary bodies", Proc. SPIE 8192, International Symposium on Photoelectronic Detection and Imaging 2011: Laser Sensing and Imaging; and Biological and Medical Applications of Photonics Sensing and Imaging, vol. 8192, No. 1, pp. 1-7, Jun. 9, 2011.
(Continued)

*Primary Examiner* — Mark Hellner
(74) *Attorney, Agent, or Firm* — BakerHostetler

(57) ABSTRACT

A method for processing a signal arising from coherent lidar includes a coherent source that is periodically frequency-modulated; a beat signal being generated by photodetector on the basis of the interference between an optical signal that is referred to as the local oscillator having a local oscillator frequency ($f_{OL}(t)$) and an optical signal that is backscattered by a target illuminated by the lidar, said beat signal being digitized; the local oscillator frequency ($f_{OL}(t)$) being made up of the sum of a mean value (f0) and of a modulation frequency ($f_{mod}(t)$) arising from the modulation of the source, the modulation frequency being periodic according to a modulation period ($T_{FO}$), each period comprising n linear portions having n frequency slopes ($\alpha i$), respectively, where n is greater than or equal to 2, the method comprising the steps consisting in: complexly modulating the beat signal; complexly demodulating the modulated signal ($S_{mod}$) by n demodulation frequencies ($f_{demod}(i)$) each having a single slope that is equal to the respective frequency slope ($\alpha i$) of the modulation frequency ($f_{mod}$), in order to obtain n demodulated signals ($S_{demod}(i)$); determining n spectral den- (Continued)

sities (SP(i)) of the n demodulated signals ($S_{demod}()$); determining n characteristic frequencies ($v_{\alpha i}$) determining information on the velocity and information on the distance of the target on the basis of said n characteristic frequencies ($v_{\alpha i}$).

11 Claims, 13 Drawing Sheets

(51) Int. Cl.
    *G01S 17/58*     (2006.01)
    *G01S 7/493*     (2006.01)
    *G01S 7/4912*     (2020.01)
    *G01S 7/481*     (2006.01)

(58) Field of Classification Search
    USPC ........................................................ 356/5.09
    See application file for complete search history.

(56) References Cited

OTHER PUBLICATIONS

Gao, et al., "Complex-optical-field lidar system for range and vector velocity measurement", Optics Express, vol. 20, No. 23, Nov. 1, 2012.

Gao, et al., "Frequency-modulated continuous-wave lidar using IQ modulator for simplified heterodyne detection", Optics Letters, vol. 37, No. 11, pp. 2022-2024, Jun. 1, 2012.

* cited by examiner

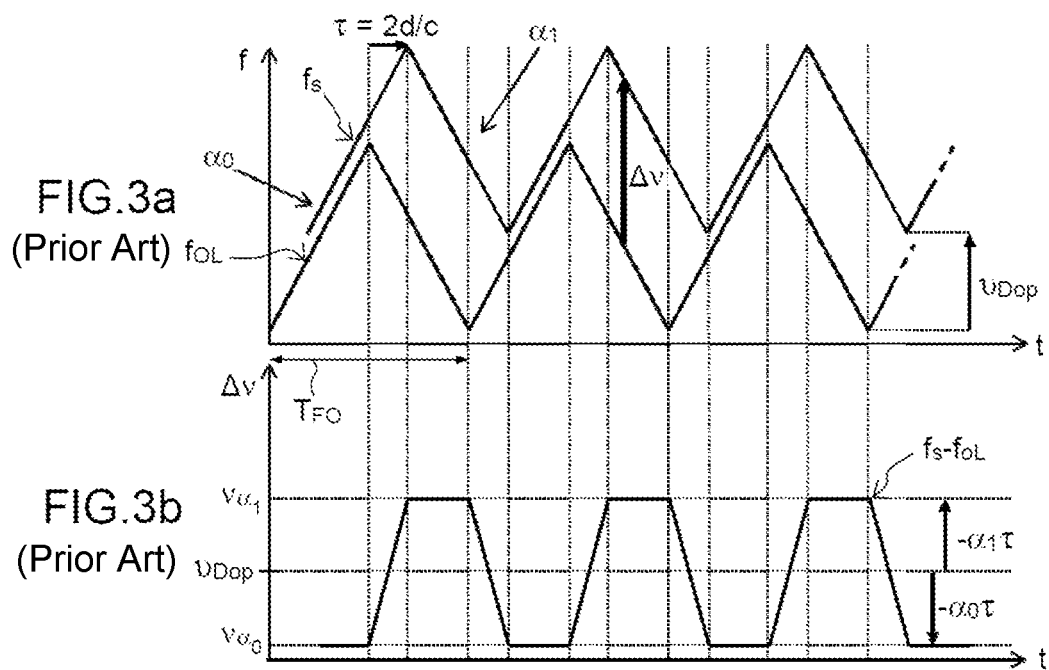

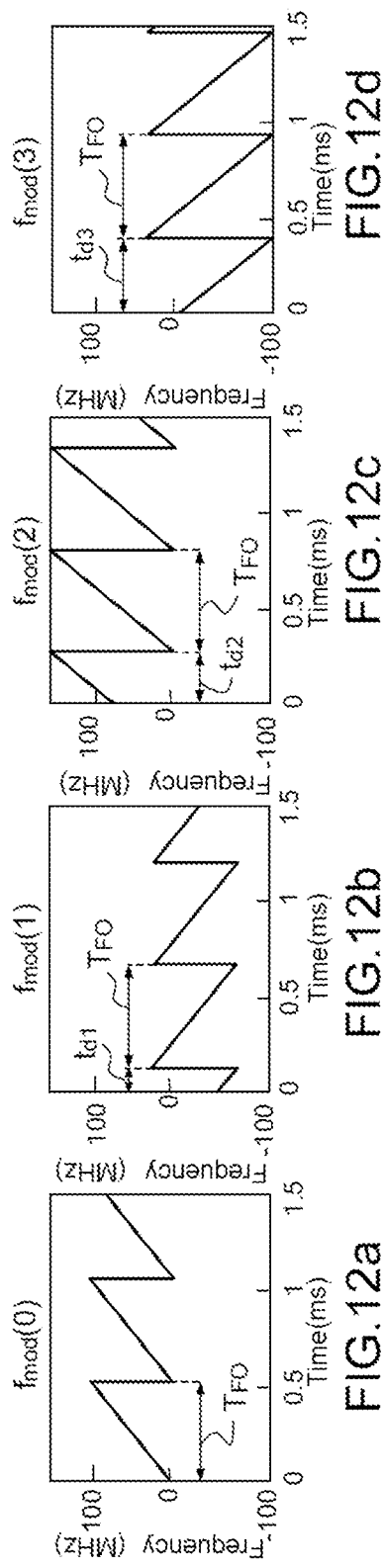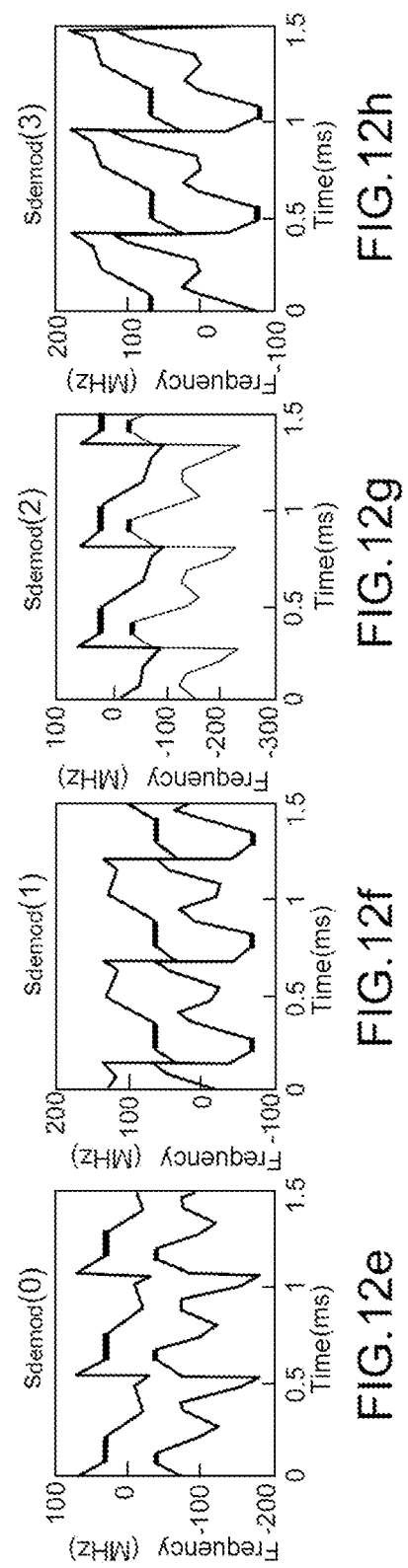

METHOD FOR PROCESSING A SIGNAL ARISING FROM COHERENT LIDAR AND ASSOCIATED LIDAR SYSTEM

CROSS-REFERENCE TO RELATED APPLICATIONS

This application is a National Stage of International patent application PCT/EP2017/070994, filed on Aug. 21, 2017, which claims priority to foreign French patent application No. FR 1601251, filed on Aug. 23, 2016, the disclosures of which are incorporated by reference in their entirety.

FIELD OF THE INVENTION

The invention relates to the field of frequency-modulated coherent lidars, which are for example used for long-range target detection.

BACKGROUND

The principle of coherent lidar is well known in the art and illustrated in FIG. 1. A coherent lidar comprises a coherent source L, typically a laser that emits a coherent light wave (in the IR, visible or near-UV domain), an emitting device DE that allows a volume of space to be illuminated, and a receiving device DR, which collects a fraction of the light wave backscattered by a target T. The Doppler frequency shift $v_{Dop}$ of the backscattered wave depends on the radial velocity v of the target T.

On reception, the received backscattered light wave S of frequency fs and a portion of the emitted wave, referred to as the local-oscillator wave OL, are mixed. The interference between these two waves is detected by a photodetector D, and the electrical signal output from the detector has an oscillating term referred to as the beat signal Sb, in addition to terms proportional to the received power and to the local-oscillator power. A processing unit UT digitizes this signal and extracts therefrom information on the velocity v of the target T.

Preferably, the processing unit electronically filters the beat signal Sb in a narrow band centered on the zero frequency, in the absence of frequency shift (see below).

For coherent lidars, the emitting and receiving devices preferably use the same optic (monostatic lidar). This feature allows a good mechanical stability to be obtained and allows the influence of atmospheric turbulence over long distances to be decreased, the propagation paths of the incident and backscattered waves being the same.

One solution for lidar velocimetry/rangefinding consists in producing a system that is able to implement frequency modulation. This technique, which is commonly used in radar, is currently of particular interest on account of the progress that has been made with fiber-based laser sources. By virtue of the frequency modulation, a time/frequency analysis allows the distance d of the target and its velocity v to be determined. This type of lidar also allows a laser anemometry function to be performed.

An example of an optical architecture for a frequency-modulated lidar 20 is illustrated in FIG. 2. The coherent source is modulated in frequency so that the frequency of the local oscillator is modulated with a preset function referred to as the waveform, which is controlled by the WFC module, which is synchronized with the processing unit UT.

The optical signal that is emitted is amplified by an amplifier EDFA, and the emission and reception use the same optic O and are separated using a circulator C. This optical signal may optionally be shifted in frequency, for example using an acousto-optical modulator that is preferably positioned before the amplifier EDFA but that may also be positioned on the path of the local oscillator. In this case, the electronic filtering in the processing unit is carried out about the shift frequency. A delay line LR allows the optical paths of the local oscillator and of the emission signal to be equalized so as to filter, in the RF domain, defects in the optical components placed after the amplifier EDFA (cross talk of the circulator C, imperfections in the antireflection coatings of the emission/reception optic O, etc.).

An example of a coherent frequency-modulated lidar is described in the document "Lidar systems for precision navigation and safe landing on planetary bodies" Farzin Amzajerdian et al, Proc. SPIE 8192, International Symposium on Photoelectronic Detection and Imaging 2011: Laser Sensing and Imaging; and Biological and Medical Applications of Photonics Sensing and Imaging, 819202 (Aug. 19, 2011). FIG. 3 illustrates the operating principle of this lidar.

In the description below, the case where the optical emission frequency and the frequency of the local oscillator are not shifted using an acousto-optical modulator is described. The frequency $f_{OL}$ of the local oscillator is modulated linearly with two frequency slopes $\alpha_0$ and $\alpha_1$ periodically with a period $T_{FO}$. This optical frequency $f_{OL}$ may be written as the sum of a constant optical frequency f0 (here the initial frequency of the laser) and a time-dependent modulation frequency $f_{mod}(t)$ in the radio frequency domain, which frequency is generated by modulating the laser source:

$$f_{OL}(t) = f0 + f_{mod}(t)$$

FIG. 3 illustrates the variation over time in the frequencies $f_{OL}(t)$ and $f_s(t)$, the optical frequency f0 having been subtracted for greater clarity. As illustrated in FIG. 3a, the backscattered signal of frequency fs(t) is shifted temporally by a time T because of the propagation to the measurement zone (target T) and therefore related to the distance d of the target, and is shifted in frequency by a value $v_{Dop}$ because of the Doppler effect with respect to the local-oscillator frequency $f_{OL}(t)$.

The detected beat signal Sb has a frequency component $fs - f_{OL}$. FIG. 3b illustrates the variation over time in $fs - f_{OL}$. It may be seen that this frequency difference comprises as a function of time two series of plateaus at the characteristic frequencies $v_{\alpha 0}$ and $v_{\alpha 1}$, which characteristic frequencies are directly related to the distance D of the target and to its radial velocity v by the equations:

$$v_{\alpha_0} = \frac{2v}{\lambda} - \frac{2\alpha_0 D}{c} \text{ and } v_{\alpha_1} = \frac{2v}{\lambda} - \frac{2\alpha_1 D}{c}$$

By measuring these two characteristic frequencies $v_{\alpha 0}$ and $v_{\alpha 1}$ of the beat signal Sb, for example by carrying out a Fourier transform thereon, d and v may be determined.

However, when the distance to the target leads to a time-of-flight longer than the duration of the waveform $T_{FO}$ normalized by the number of frequency slopes (2 in the example), direct analysis by Fourier transform yields unsatisfactory results. Specifically, the mixing of the local oscillator and of the backscattered signal leads to the disappearance of the plateaus and to a constantly variable instantaneous frequency that, after analysis by Fourier transform, will yield no peaks.

An example of this effect is illustrated in FIG. 4, for a local-oscillator modulation with two frequency slopes $\alpha_0=2$ MHz/µs and $\alpha_1=-2$ MHz/µs, and a target moving at a velocity of 30 m/s.

FIG. 4a illustrates the temporal variation in fs with respect to $f_{OL}$ and the frequency component of Sb fs–$f_{OL}$ for a distance d of 1800 m, FIG. 4b showing the same for a distance d of 14000 m and FIG. 4c the same for a distance d of 20000 m.

In this case, the range of the lidar is therefore limited by the processing of the signal whatever the power of the laser. It is theoretically possible to lengthen the modulation period $T_{FO}$ of the waveform, but since the modulation range of certain lasers is limited, this lengthening does not allow a high resolution to be simultaneously achieved at long distance. Specifically, given the limited modulation bandwidth of the laser, it is possible to increase the period $T_{FO}$ while decreasing the frequency slopes in order to cover the same modulation bandwidth. In this case, frequency plateaus will exist at longer distances but, for a Fourier-transform duration $T_{FFT}$ that is constant and shorter than the modulation frequency $T_{FO}$, the modulation bandwidth covered during $T_{FFT}$ will be smaller and therefore the longitudinal resolution, which is proportional to this bandwidth, will be degraded.

SUMMARY OF THE INVENTION

One aim of the present invention is to remedy the aforementioned drawbacks by providing a beat-signal processing method allowing this limitation to be overcome by allowing a signal having characteristic frequency plateaus to once again be obtained.

One subject of the present invention is a method for processing a signal generated by a coherent lidar comprising a coherent source that is periodically modulated in frequency,
  a beat signal being generated by a photodetector from the interference between an optical signal referred to as the local oscillator, having a local-oscillator frequency, and an optical signal backscattered by a target illuminated by the lidar, said beat signal being digitized,
  the local-oscillator frequency consisting of the sum of an average value and of a modulation frequency that is generated by modulating the source, the modulation frequency being periodic with a modulation period, each period comprising n linear portions having n frequency slopes, respectively, n being higher than or equal to 2, the method comprising steps of:
  modulating in a complex way the beat signal with the modulation frequency in order to obtain a modulated signal,
  demodulating in a complex way the modulated signal with n demodulation frequencies each having a single slope equal to the respective frequency slope of the modulation frequency, in order to obtain n demodulated signals,
  determining n spectral densities of the n demodulated signals,
  determining n characteristic frequencies corresponding to the maximum of the n spectral densities, respectively,
  determining information on the velocity and information on the distance of the target from said n characteristic frequencies.

According to one embodiment, the step of determining each spectral density comprises substeps of:
  determining a plurality of elementary spectral densities for a plurality of time intervals shorter than or equal to the modulation period,
  determining said spectral density from the sum of the plurality of elementary spectral densities.

Preferably, each elementary spectral density is determined by fast Fourier transform or FFT, and the spectral density is equal to an average of the elementary spectral densities.

Advantageously, each demodulation frequency is periodic with the modulation period.

Advantageously, the frequency slopes are indexed by an index i varying from 0 to n−1 and wherein each demodulation frequency having a slope of index i is temporally shifted with respect to the modulation frequency by a shift time that is dependent on i, on n and on the modulation period.

According to one variant, the waveform comprises 4 slopes $\alpha 0$, $\alpha 1$, $\alpha 2$, $\alpha 3$ with:

$$\alpha 1 = -\alpha 0 \text{ and } \alpha 3 = -\alpha 2$$

The invention also relates to a coherent lidar system comprising:
  a coherent source that is periodically modulated in frequency,
  a device for emitting an optical signal generated by the coherent source and a device for receiving a signal backscattered by a target that is illuminated by the lidar,
  a photodetector configured to generate a beat signal from the interference between an optical signal referred to as the local oscillator, having a local-oscillator frequency, and the backscattered optical signal, the local-oscillator frequency consisting of the sum of an average value and of a modulation frequency that is generated by modulating the source, the modulation frequency being periodic with a modulation period, each period comprising n linear portions having n frequency slopes, respectively, n being higher than or equal to 2,
  a processing unit configured to:
    digitize the beat signal,
    modulate in a complex way the beat signal with the modulation frequency in order to obtain a modulated signal,
    demodulate in a complex way the modulated signal with n demodulation frequencies each having a single slope equal to the respective frequency slope of the modulation frequency in order to obtain n demodulated signals,
    determine n spectral densities of the n demodulated signals,
    determine n characteristic frequencies corresponding to the maximum of the n spectral densities, respectively,
    determine information on the velocity and information on the distance of the target from said n characteristic frequencies.

Preferably, the processing unit is furthermore configured to determine, for each spectral density, a plurality of elementary spectral densities for a plurality of time intervals shorter than or equal to the modulation period, said spectral density being determined from the sum of the plurality of elementary spectral densities.

Advantageously, each elementary spectral density is determined by fast Fourier transform, and wherein the spectral density is equal to an average of the elementary spectral densities.

Advantageously, the processing unit comprises n channels, one channel per slope, each channel operating in parallel with the others and being configured to determine the associated frequency.

BRIEF DESCRIPTION OF THE DRAWINGS

Other features, aims and advantages of the present invention will become apparent on reading the following detailed description with reference to the appended drawings, which are given by way of nonlimiting example, and in which:

FIG. 3a, which has already been described, illustrates the variation over time in the frequencies $f_{OL}(t)$ and $f_s(t)$. FIG. 3b, which has already been described, illustrates the variation over time in fs–$f_{OL}$.

FIG. 7a illustrates the variation as a function of time in the local-oscillator frequency $f_{OL}(t)$ and in the signal frequency fs(t). FIG. 7b illustrates the two frequency components of the lidar beat signal Sb, fs–$f_{OL}$ and $f_{OL}$–fs. FIG. 7c illustrates the variation as a function of time in the frequency of the obtained modulated signal $S_{mod}$. FIGS. 7d and 7e illustrate the variation as a function of time in the demodulation frequencies $f_{mod}(0)$ (for slope α0) and $f_{mod}(1)$ (for slope α1), respectively. FIGS. 7f and 7g illustrate the variation as a function of time in the demodulated signal $S_{demod}(0)$ and $S_{demod}(1)$, respectively.

FIG. 9a illustrates the variation as a function of time in the local-oscillator frequency $f_{OL}(t)$ and in the signal frequency fs(t). FIG. 9b illustrates the two frequency components of the lidar beat signal Sb, fs–$f_{OL}$ and $f_{OL}$–fs. FIG. 9c illustrates the variation as a function of time in the frequency of the obtained modulated signal Smog. FIGS. 9d and 9e illustrate the variation as a function of time in the demodulation frequencies $f_{mod}(0)$ (for slope α0) and $f_{mod}(1)$ (for slope α1), respectively. FIGS. 9f and 9g illustrate the variation as a function of time in the demodulated signal $S_{demod}(0)$ and $S_{demod}(1)$, respectively.

Figure 10:
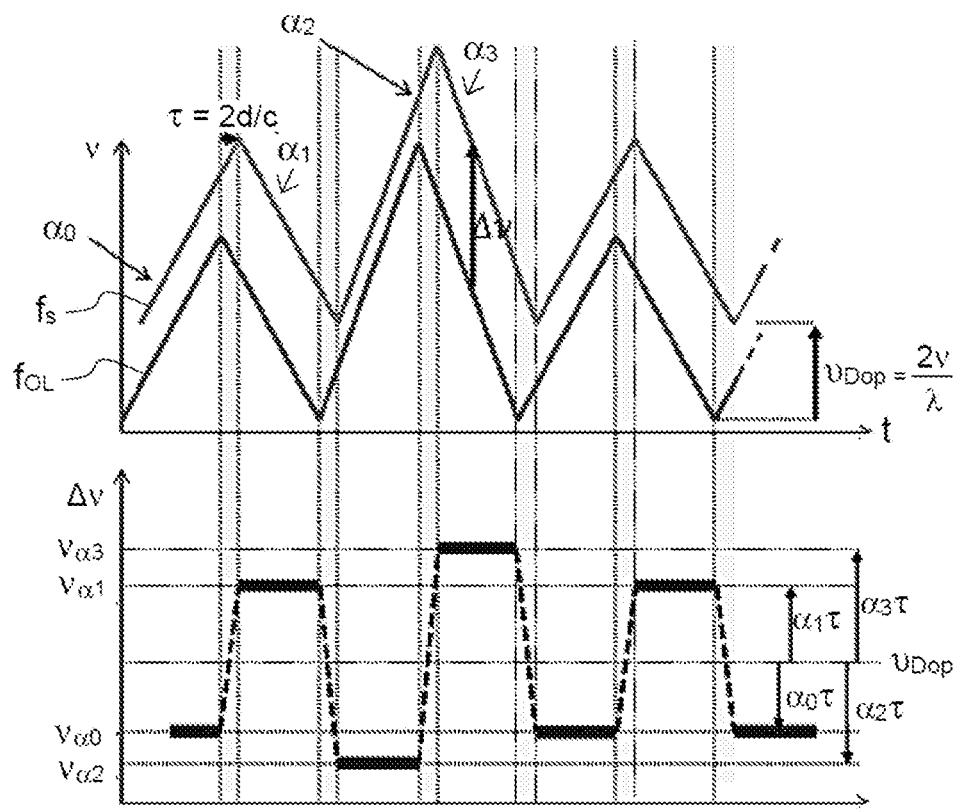

The top portion of FIG. 10 illustrates the variation over time in the frequencies $f_{OL}(t)$ and $f_s(t)$, and the bottom portion of FIG. 10 illustrates the variation over time in $f_s$–$f_{OL}$ for the case where $f_{mod}$ has 4 slopes.

Figure 11A:
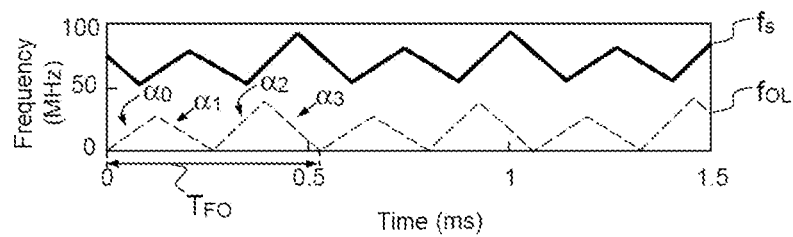
Figure 11B:
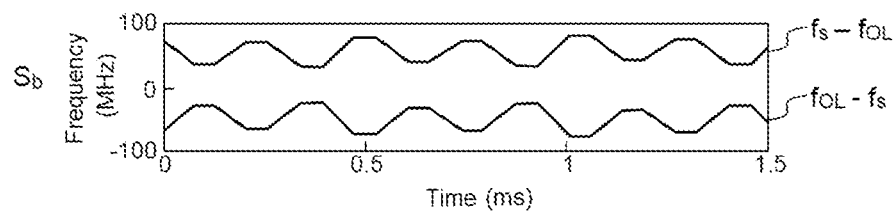
Figure 11C:
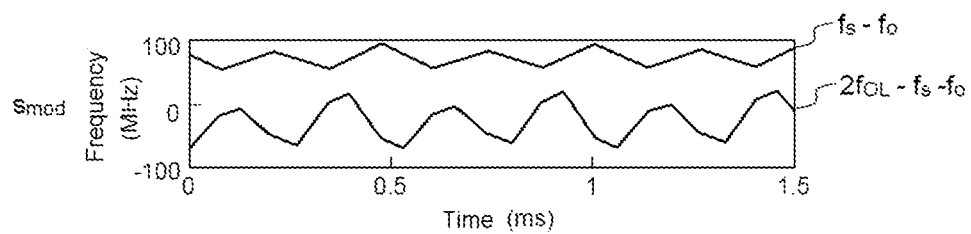

FIG. 11a illustrates the variation over time in the frequencies $f_{OL}(t)$ and $f_s(t)$, FIG. 11b illustrates the two frequency components of the lidar beat signal Sb, fs–$f_{OL}$ and $f_{OL}$–fs, and FIG. 11c illustrates the variation as a function of time in the frequency of the obtained modulated signal $S_{mod}$ for a waveform comprising 4 slopes.

FIGS. 12a, 12b, 12c and 12d illustrate the variation as a function of time in the demodulation frequencies $f_{mod}(0)$ (for slope α0) and $f_{mod}(1)$ (for slope α1), $f_{mod}(2)$ (for slope α2) and $f_{mod}(3)$ (for slope α3), respectively and FIGS. 12e, 12f, 12g and 12h illustrate the variation as a function of time in the demodulated signal $S_{demod}(0)$, $S_{demod}(1)$, $S_{demod}(2)$ and $S_{demod}(3)$, respectively.

Figure 13:
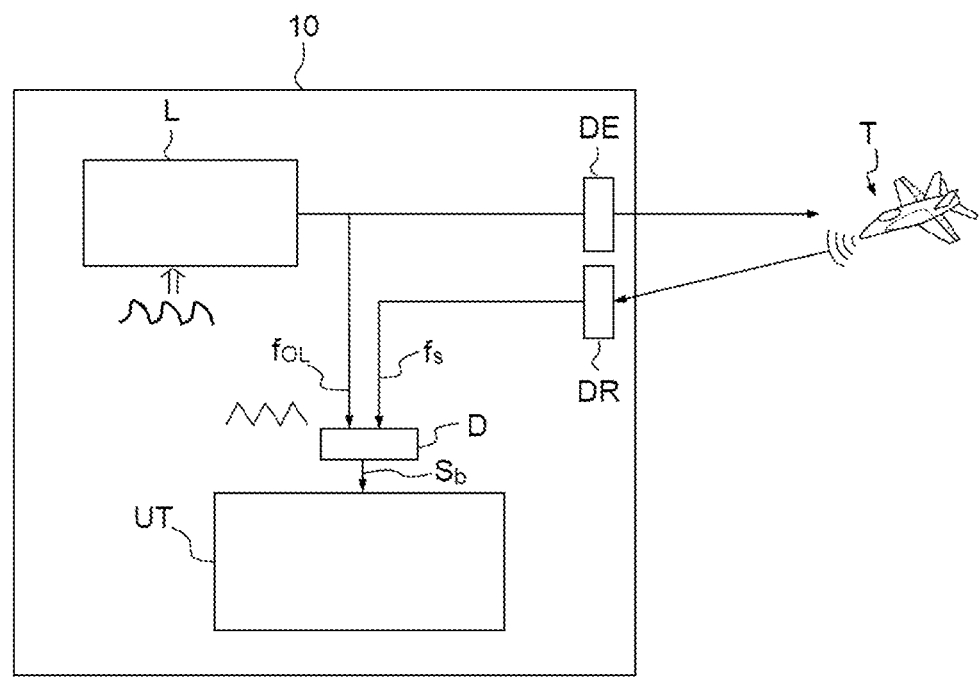

FIG. 13 schematically shows a lidar system according to the invention.

Figure 14:
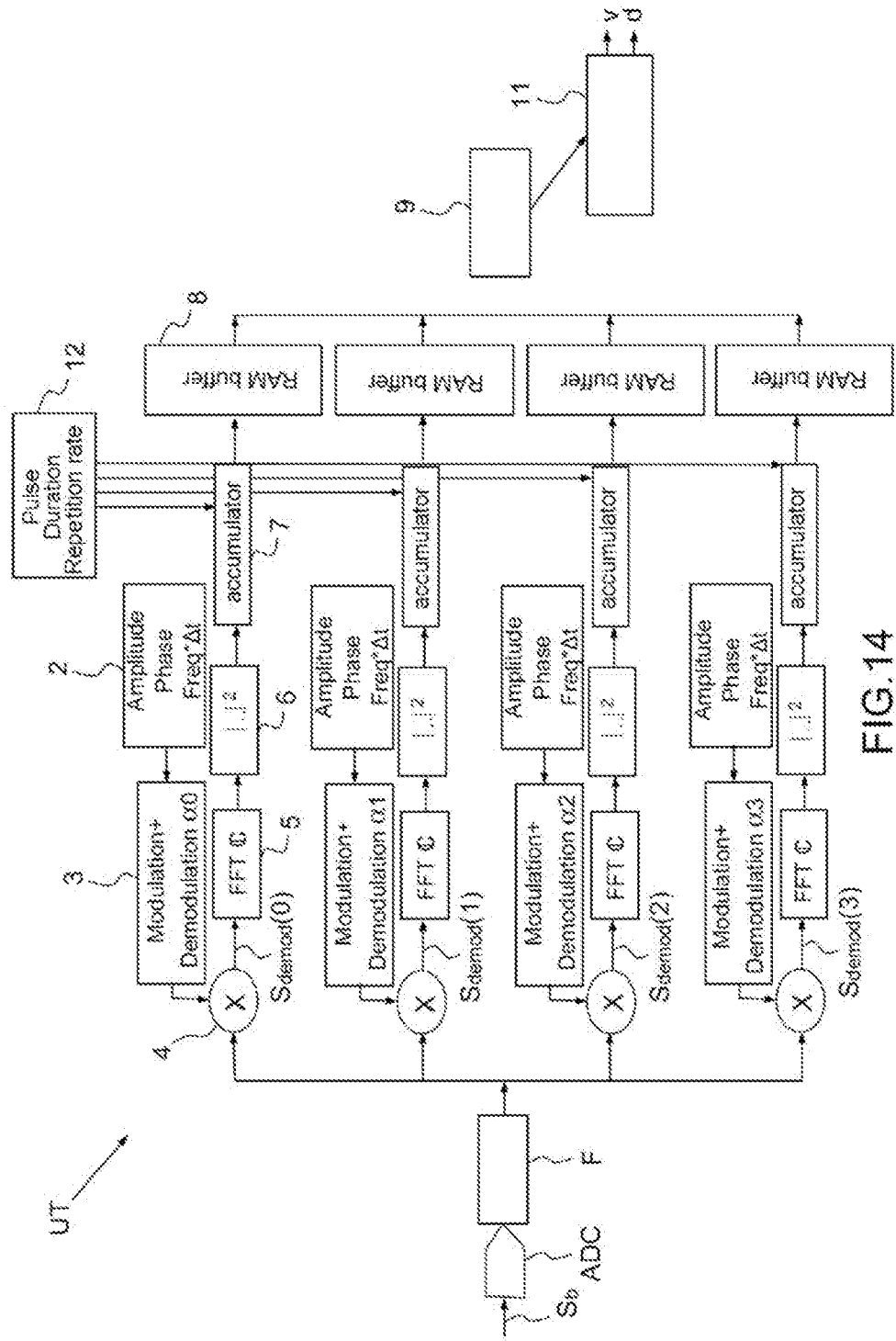

FIG. 14 illustrates an example of implementation of a parallel architecture in the processing unit of the lidar according to the invention.

DETAILED DESCRIPTION

Figure 1:
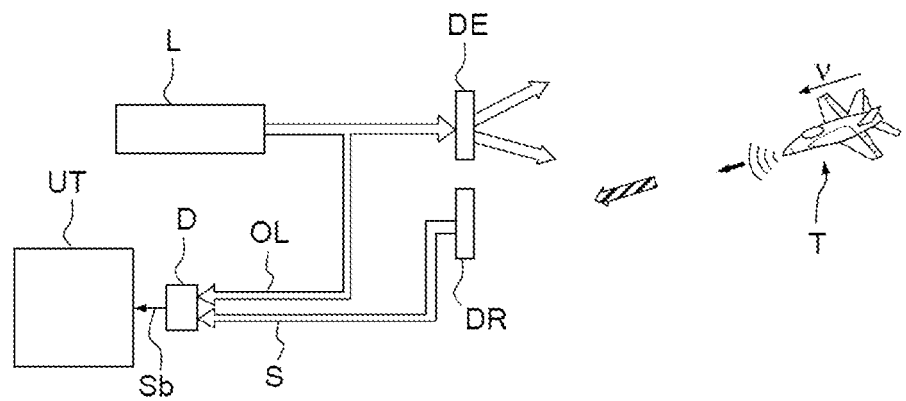
FIG. 1, which has already been described, illustrates the principle of a coherent lidar.
Figure 2:
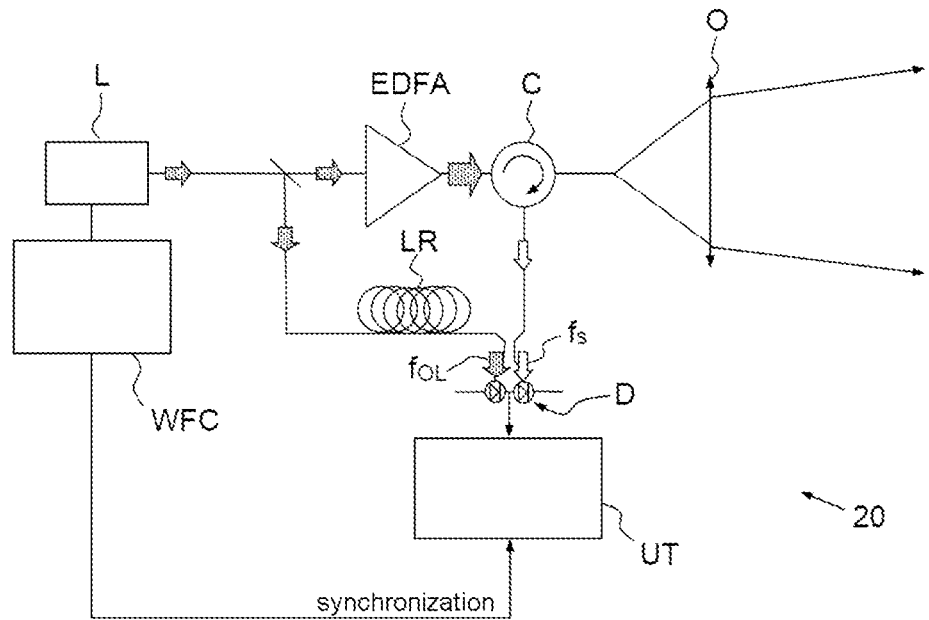
FIG. 2, which has already been described, illustrates an example of an optical architecture for a frequency-modulated lidar.
Figure 4A:
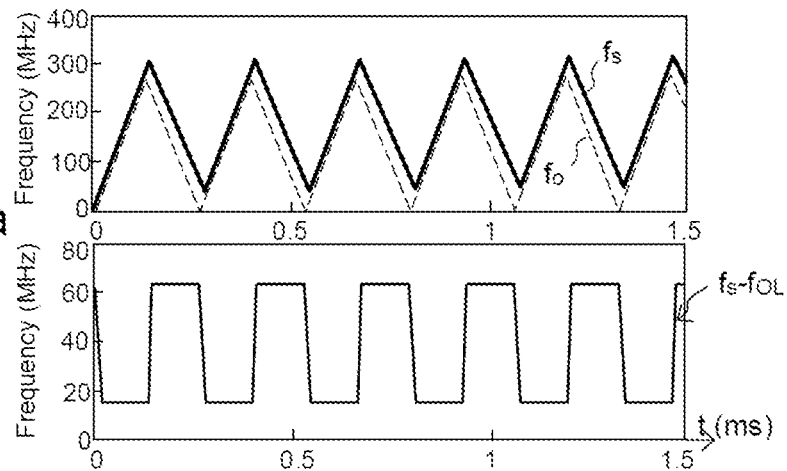
FIG. 4a, which has already been described, illustrates the temporal variation in fs with respect to $f_{OL}$ and the frequency component of Sb fs–$f_{OL}$ for a distance d of 1800 m, FIG. 4b showing the same for a distance d of 14000 m and FIG. 4c the same for a distance d of 20000 m.
Figure 4B:
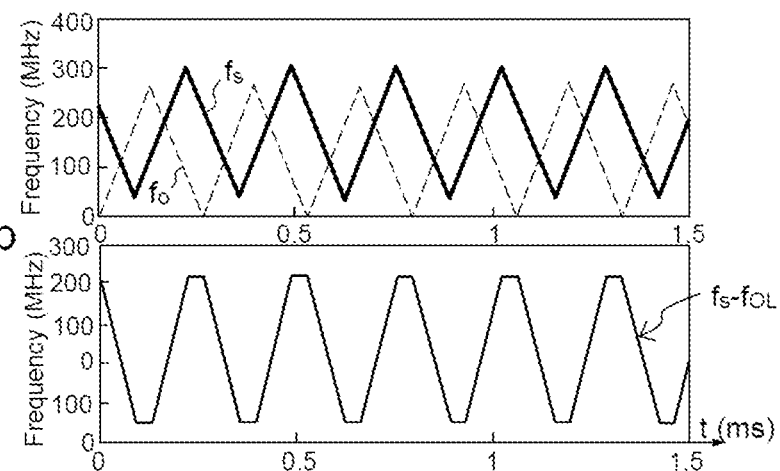
Figure 4C:
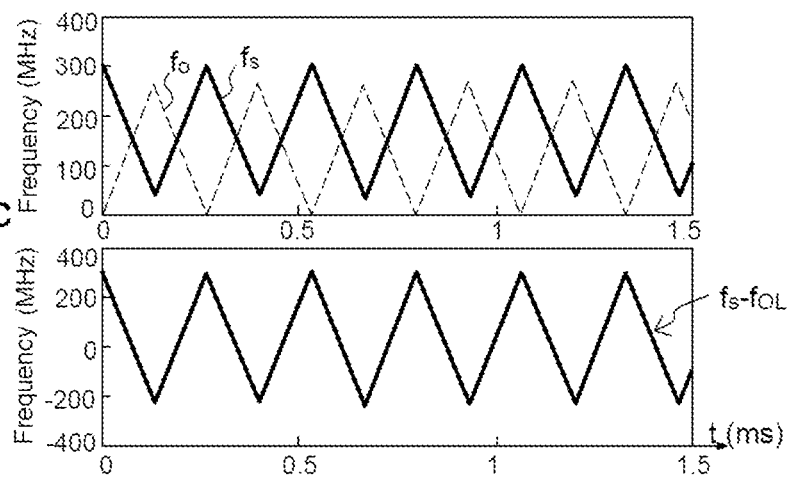
Figure 5:
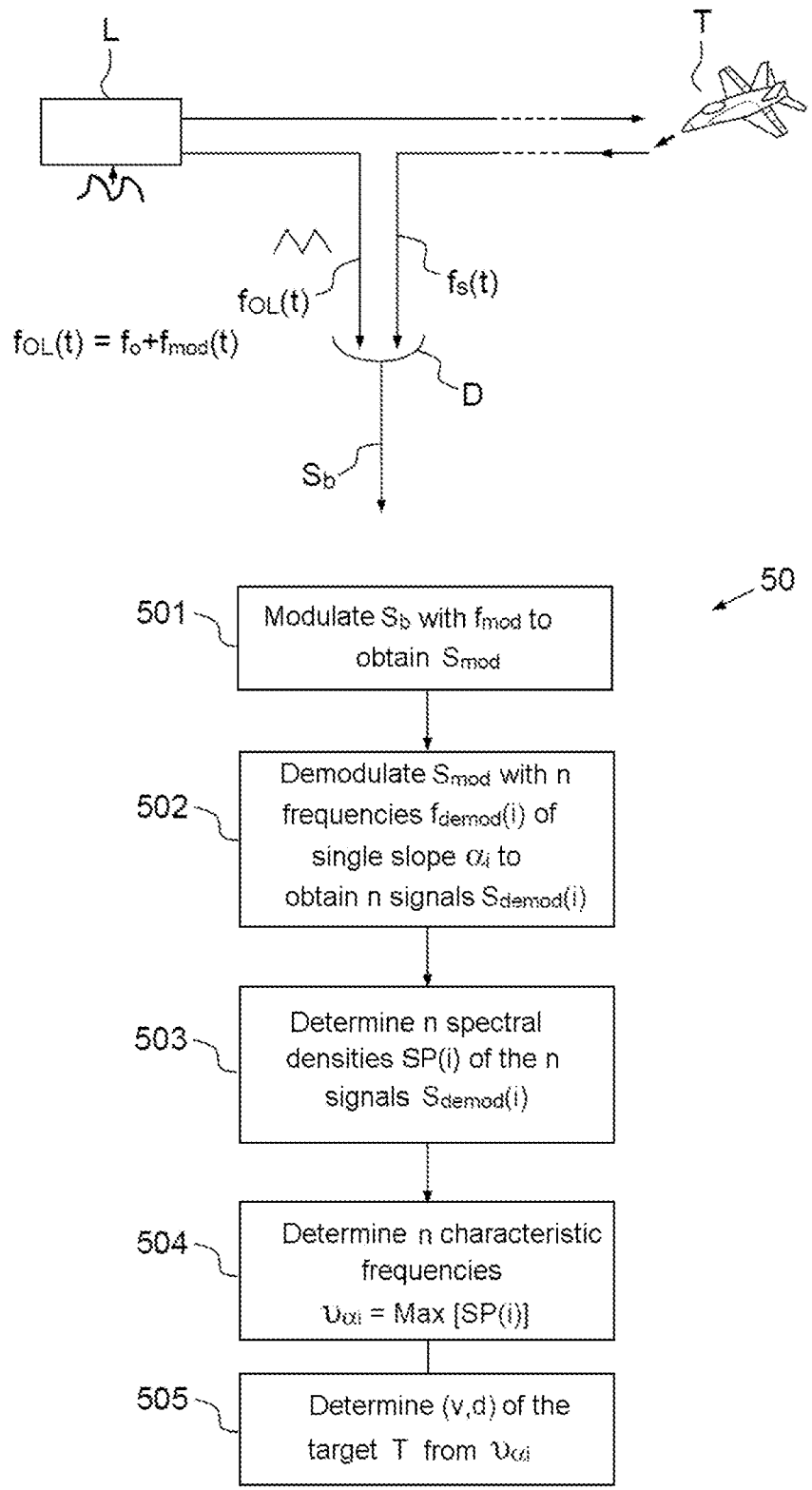
FIG. 5 illustrates the method for processing the signal generated by a coherent lidar according to the invention.

The method 50 for processing the signal generated by a coherent lidar according to the invention is illustrated in FIG. 5. The coherent lidar comprises a coherent source L that is periodically modulated with an RF signal. The RF modulation may be achieved directly via the injection current of the laser or via an exterior component. By RF what is meant is a wave having a frequency comprised between 1 Hz and 10 GHz, and preferably between 0.1 kHz and 10 MHz.

A beat signal Sb is generated by a photodetector D from the interference between an optical signal, referred to as the local oscillator OL, having a local-oscillator frequency $f_{OL}(t)$, and an optical signal fs(t) backscattered by a target T illuminated by the lidar. The beat signal is digitized in order to be processed.

The local-oscillator frequency $f_{OL}(t)$ consists of the sum of an average value f0 and of a modulation frequency $f_{mod}(t)$ that is generated by modulating the source.

$$F_{OL}(t) = f0 + f_{mod}(t)$$

When no shifting acoustic modulator is used, the frequency f0 is equal to the initial optical frequency of the source L. When the signal OL is shifted in frequency by an acousto-optical modulator, the frequency f0 is equal to the optical frequency of the source shifted.

The modulation frequency $f_{mod}(t)$ is periodic with a modulation period $T_{FO}$, and originates from the periodic RF modulation of the source, but is not equivalent to the latter, because of the non-linear behavior of the laser. Typically, the period $T_{FO}$ is comprised between 1 ns and one second, and preferably between 100 ns and 10 ms.

In order for the method according to the invention to work correctly, the modulation frequency $f_{mod}(t)$ must be such that each period comprises n linear portions, i.e. n frequency slopes αi, with i an index varying from 0 to n–1, that meet at apexes. The number of slopes n is higher than or equal to 2.

Advantageously, n is even, because, as specified below, this allows the signs of the slopes αi to be alternated and the signal processing to thus be simplified.

Figure 6:
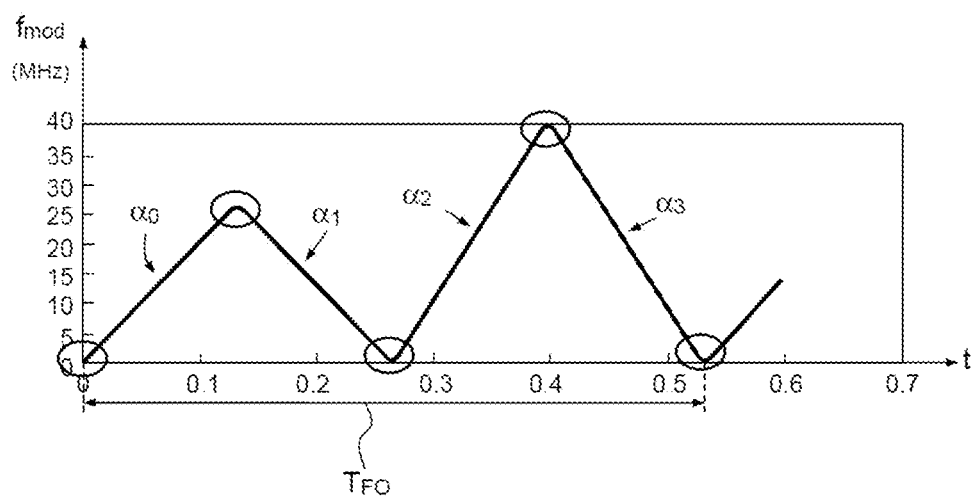
FIG. 6 schematically shows a periodic waveform of a modulation frequency $f_{mod}(t)$ as a function of time, said waveform consisting of a sequence of 4 slopes α0, α1, α2 and α3.

In practice, given the modulation frequency bandwidth accessible to current lasers, it is difficult to obtain acute angles at these apexes, and the latter are generally rounded, as illustrated in FIG. 6 for a frequency $f_{mod}(t)$ consisting of a sequence of 4 slopes α0, α1, α2 and α3. The form of the modulation signal of $f_{mod}$ over a period $T_{FO}$ is referred to as the waveform.

Preferably, the slope of index i+1 $\alpha_{i+1}$ has the opposite sign to the slope of index i $\alpha_i$. This allows the frequency band covered to be narrowed while maintaining the same fraction of the period $T_{FO}$ for each slope (and therefore the same order of magnitude of line intensity for each frequency slope).

Preferably, the slopes of uneven indices are equal to the opposite of the slopes of even index.

For a signal $f_{mod}$ with two slopes α1=−α0

For a signal $f_{mod}$ with four slopes α0=−α0 and α3=−α2

In the latter case, the waveform may be divided into four equal portions (leading to four lines of similar intensity) without recourse being made to frequency discontinuities. Preferably, the slopes αi are comprised between 0.1 MHz/μs and a few hundred MHz/μs.

It will be noted that it is not easy to obtain a local-oscillator optical frequency that is modulated with a sequence of preset linear slopes such as illustrated in FIG. 6. To do this it is necessary to pre-correct the RF modulation signal of the source, as for example described in patent application FR No. 1500603. For the application of the invention, the waveform of $f_{mod}$ is assumed known with a decent precision.

Before the steps of the method 50 according to the invention are described, the terminology employed will be defined.

The operation consisting in adding a frequency to an initial signal is referred to as modulation and the operation consisting in subtracting a frequency from the initial signal is referred to as demodulation. Thus modulating at +f is equivalent to demodulating at −f and vice versa.

In the time domain, modulation or demodulation consists in multiplying an initial temporal signal S0(t) by a number, which is a real number for a real modulation/demodulation (a cosine) and a complex number for a complex modulation/demodulation.

For example, modulating in a complex way with a frequency f is equivalent to multiplying S0(t) by exp(2jπft). Likewise demodulating in a complex way with a frequency f is equivalent to multiplying S0(t) by exp(−2jπft).

When the frequency f(t) is a function of time, it is recommended to multiply by $\exp[2j\pi\int_0^t f(u)du]$ for a modulation and by $\exp[-2j\pi\int_0^t f(u)du]$ for a demodulation. The method 50 according to the invention consists of specific digital processing of a signal generated by a coherent lidar, to determine information on the velocity and on the distance of a target illuminated by the lidar. More particularly, the method is applicable to the processing of the lidar beat signal Sb. The first steps of the method are illustrated in FIGS. 7a-7g for the case of a signal $f_{mod}$ having two slopes α0 and α1.

The method 50 according to the invention comprises a first step 501 consisting in modulating in a complex way the beat signal Sb with the modulation frequency $f_{mod}$ in order to obtain a modulated signal $S_{mod}$.

Figure 7A:
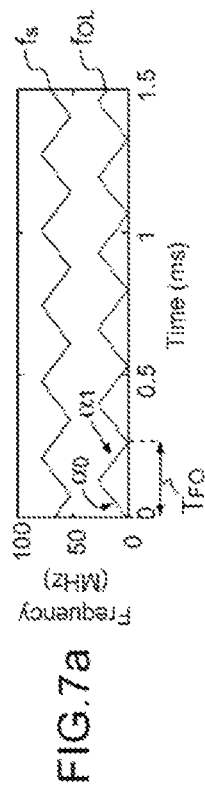
FIGS. 7a-7g illustrate the case of a target moving with a velocity of 40 m/s at a distance of 12 km, the waveform of the signal $f_{mod}$ comprising 2 slopes α0=0.2 MHz/µs and α1=–0.2 MHz/µs for an average laser frequency of 1.55 µm.

FIG. 7a illustrates the variation as a function of time in the local-oscillator frequency $f_{OL}(t)$ and in the signal frequency fs(t), the average optical frequency f0 having been subtracted for greater clarity.

Figure 7B:
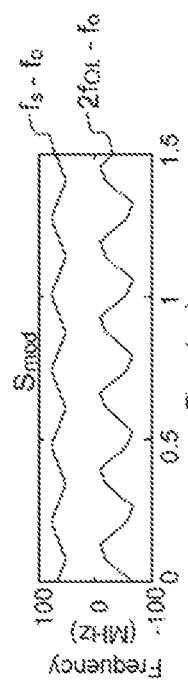

FIG. 7b illustrates the two frequency components of the lidar beat signal Sb, fs−$f_{OL}$ and $f_{OL}$−fs. Specifically, since it is real, it has a positive frequency component and a negative frequency component.

Figure 7D:
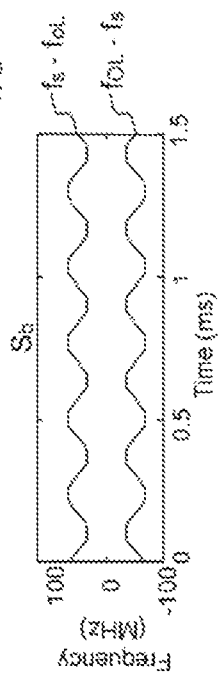
Figure 7C:
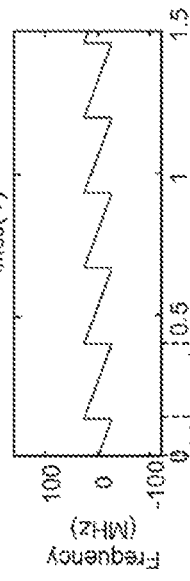

FIG. 7c illustrates the variation as a function of time in the frequency of the obtained modulated signal $S_{mod}$. The real lidar beat signal Sb is modulated in a complex way digitally with a frequency associated with the waveform, i.e. $f_{OL}$−f0, where f0 is the average frequency of the laser source L. An instantaneous frequency is then reconstructed for the modulated signal $S_{mod}$, this instantaneous frequency corresponding to:

$$fs-f_{OL}+(f_{OL}-f0)=fs-f0$$

$$f_{OL}-fs+(f_{OL}-f0)=2f_{OL}-f0-fs$$

Next, a step 502 consists in demodulating in a complex way the modulated signal $S_{mod}$ with n demodulation frequencies $f_{demod}(i)$ having a single slope equal to one frequency slope αi of the modulation frequency $f_{mod}$, respectively, in order to obtain n demodulated signals $S_{demod}(i)$. Thus n complex demodulations are applied using n digital signals $f_{demod}(i)$ of single slope αi.

To take into account the periodicity of the waveform, it is recommended to regularly return to zero. The demodulation frequencies $f_{demod}(i)$ are preferably periodic with a multiple of $T_{FO}$, and preferably have a period equal to $T_{FO}$. This equality makes it possible to make the frequency plateaus (and therefore the lines, after spectral analysis) of the various analyzed waveform periods coincide: for each frequency slope αi, the associated line will appear at the same frequency $v_{\alpha 1}$ and, therefore, the energy associated with a target signal will be concentrated in the same line after time-frequency analysis.

Figure 7E:
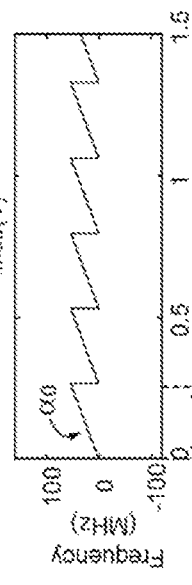

FIGS. 7d and 7e illustrate the variation as a function of time in the demodulation frequencies $f_{mod}(0)$ (for slope α0) and $f_{mod}(1)$ (for slope α1), respectively.

In order to reset the various frequencies, the demodulation frequency of index i (corresponding to a slope αi) is shifted by a shift time tdi that is dependent on i, on n and on the modulation period $T_{FO}$. Preferably, the shift time is equal to:

$$tdi=i/n*T_{FO}$$

Figure 7F:
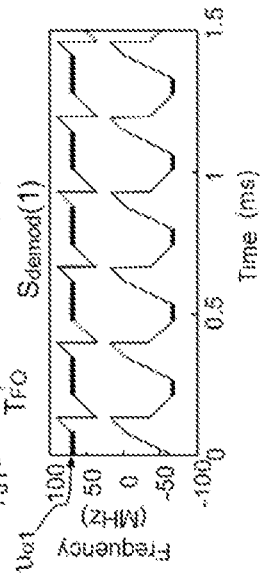
Figure 7G:
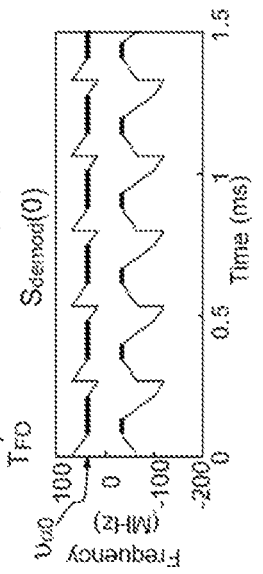

Thus, for 2 slopes $f_{mod}(0)$ is not shifted and $f_{mod}(1)$ is shifted by $T_{FO}/2$ (see FIG. 7e). FIGS. 7f and 7g illustrate the variation as a function of time in the demodulated signal $S_{demod}(0)$ and $S_{demod}(1)$ respectively.

Each demodulation corresponds to the search for the signal of interest in all of the distance boxes. A plateau of characteristic frequency $v_{\alpha i}$ is then found in the demodulated signal of index i. For the case of 2 slopes, $S_{demod}(0)$ allows $v_{\alpha 0}$ to be determined whereas $S_{demod}(1)$ allows $v_{\alpha 1}$ to be determined. The frequency $v_{\alpha 1}$ corresponds to the offset, measured at a time for which fs(t)−f0 has a frequency slope αi, between the demodulation frequency $f_{mod}(i)$ and the frequency fs(t)−f0, itself having been reconstructed using the modulation of the beat signal with the frequency $f_{OL}$−f0.

Each frequency $v_{\alpha i}$ corresponds to the offset, measured at a time for which fs(t)−f0 has a frequency slope αi, between the demodulation frequency $f_{mod}(i)$ and the frequency fs(t)−f0, itself having being reconstructed using the modulation of the beat signal with the frequency $f_{OL}$−f0.

In FIG. 7f, the widest plateau corresponds to +$v_{\alpha 0}$ whereas the narrower plateau corresponds to −$v_{\alpha 0}$. Specifically, the demodulation function is tailored to the frequency of interest, here +$v_{\alpha 0}$ (radial velocity of the target positive). In the same way in FIG. 7g, the widest plateau corresponds to +$v_{\alpha 0}$ whereas the narrower plateau corresponds to −$v_{\alpha 1}$.

In order to measure these characteristic frequencies, the method 50 according to the invention also comprises a step 503 of determining n spectral densities SP(i) of the n demodulated signals $S_{demod}(i)$. It is a question of carrying out a time/frequency analysis, i.e. a frequency transform of the signal $S_{demod}(i)$ (t), in order to make the characteristic frequency $v_{\alpha i}$ appear in the form of peaks. Advantageously, it is possible to include a temporal windowing that depends on the analysis distance range and on the analysis frequency slope.

Figure 8A:
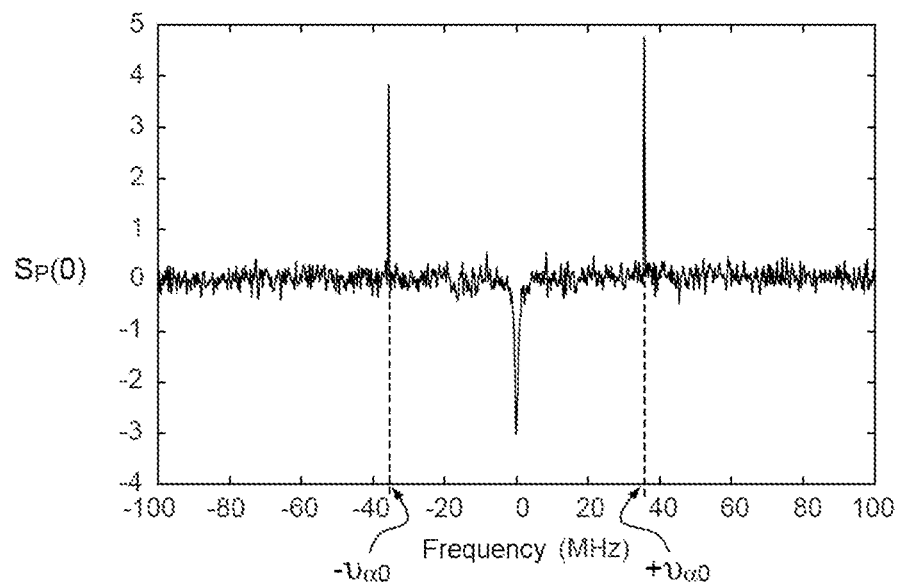
FIGS. 8a and 8b illustrates the spectral densities SP(0) (FIG. 8a) and SP1 (FIG. 8b) of the spectra determined from the signals $S_{demod}(0)$ and $S_{demod}(1)$.
Figure 8B:
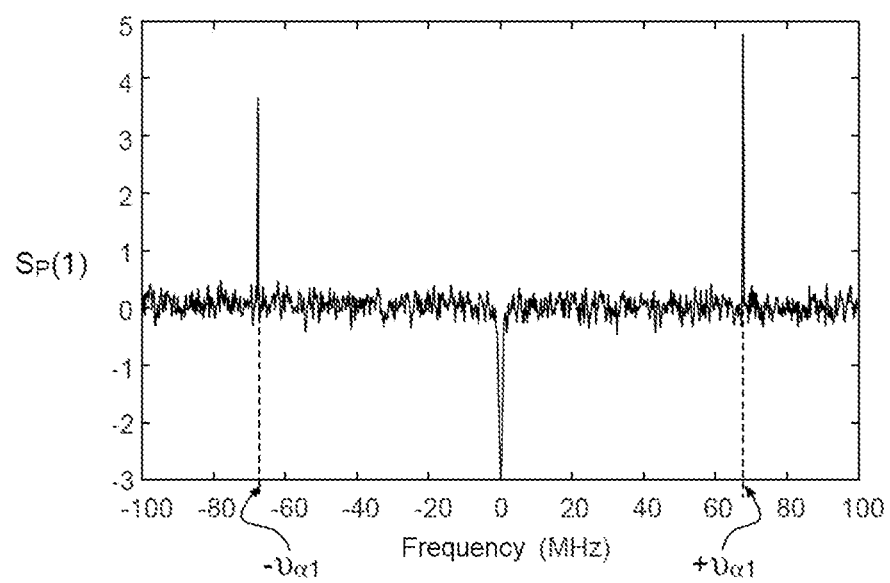

FIG. 8 illustrates the spectral densities SP(0) (FIG. 8a) and SP(1) (FIG. 8b) of the spectra determined from the signals $S_{demod}(0)$ and $S_{demod}(1)$. The sought characteristic frequency $v_{\alpha 1}$ has the highest spectral density. A weaker peak is found at the opposite frequency. A negative peak at the zero frequency is due to filtering of the signal at low frequencies.

Next, the method according to the invention comprises a step 504 of determining the n characteristic frequencies $v_{\alpha 1}$ corresponding to the maximum of the n spectral densities SP(i), respectively. Specifically, the frequency having the widest plateau in the signal $S_{demod}/i(t)$, which corresponds to the sought characteristic frequency, is the frequency having the highest spectral density.

A second plateau of less substantial duration (and therefore leading to a less intense line after spectral analysis) is also present but the corresponding frequency has a lower spectral density than that of the characteristic frequency. This signal originates from the modulations and demodulations described above on the other component of the beat signal, i.e. the component generated by the real detection (negative frequency component if the target signal corresponds to a positive frequency or, conversely, positive frequency component if the target signal corresponds to a negative frequency).

Lastly, the method 50 comprises a step 505 of determining information on the velocity v and information on the distance D of the target T from said n characteristic frequencies $v_{\alpha 1}$, using the formula:

$$v_{\alpha_i} = \frac{2v}{\lambda} - \frac{2\alpha_i D}{c}$$

For 2 frequency slopes:

$$v_{\alpha_0} = \frac{2v}{\lambda} - \frac{2\alpha_0 D}{c} \text{ and } v_{\alpha_i} = \frac{2v}{\lambda} - \frac{2\alpha_i D}{c}$$

It will be noted that the above formulae are valid when the frequency of the laser is not shifted by an acousto-optical modulator. When such is the case, where $f_{MAO}$ is the frequency shift, the characteristic frequencies are calculated with the formula:

$$v_{\alpha_i} = \frac{2v}{\lambda} - \frac{2\alpha_i D}{c} + f_{MAO}$$

The invention is of course compatible with such a shift provided that step 505 of determining d and v from the values of the characteristic frequencies is adapted accordingly.

FIGS. 7a-7g correspond to a target moving with a velocity of 40 m/s at a distance of 12 km, and the waveform of the signal $f_{mod}$ comprises 2 slopes $\alpha 0=0.2$ MHz/µs and $\alpha 1=-0.2$ MHz/µs for an average laser frequency of 1.55 µm, i.e. 193.41 THz. The period $T_{FO}$ is equal to 532 µs.

The detected characteristic frequencies are $v_{\alpha 0}=35.6$ MHz and $v_{\alpha 1}=67.6$ MHz. For $S_{mod}(0)$, a weaker peak remains at $-35.6$ MHz and for $S_{mod}(1)$ at $-67.6$ MHz corresponding to the narrowest plateau.

FIGS. 9a-9g are equivalent to FIGS. 7a-7g but for a target located at a distance of 18 km.

Figure 9A:
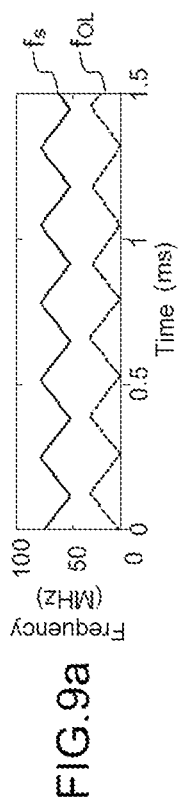
FIGS. 9a-9g are equivalent to FIGS. 7a-7g but for a target located at a distance of 18 km.

FIG. 9a illustrates the variation as a function of time in the local-oscillator frequency $f_{OL}(t)$ and in the signal frequency fs(t).

Figure 9B:
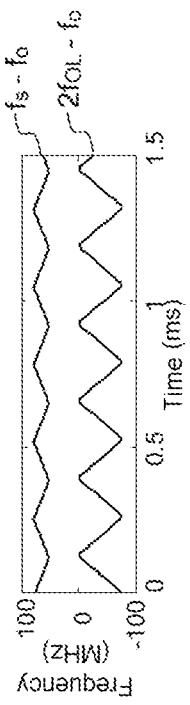

FIG. 9b illustrates the two frequency components of the lidar beat signal Sb, fs–$f_{OL}$ and $f_{OL}$–fs.

Figure 9C:
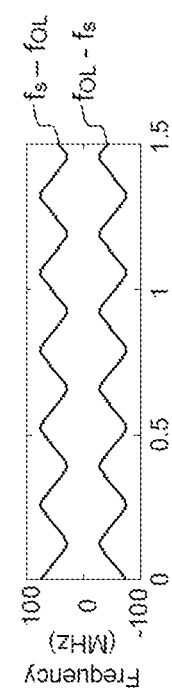

FIG. 9c illustrates the variation as a function of time in the frequency of the obtained modulated signal $S_{mod}$.

Figure 9D:
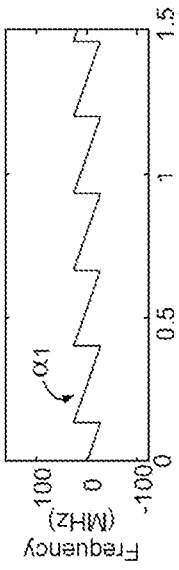
Figure 9E:
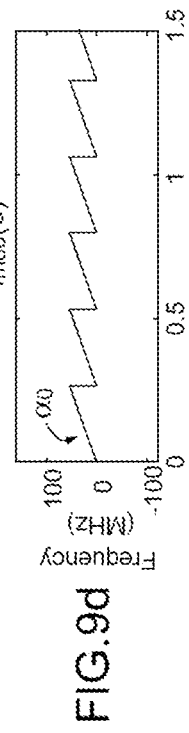

FIGS. 9d and 9e illustrate the variation as a function of time in the demodulation frequencies $f_{mod}(0)$ (for slope $\alpha 0$) and $f_{mod}(1)$ (for slope $\alpha 1$), respectively.

Figure 9F:
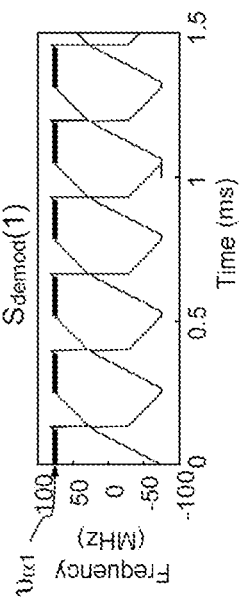
Figure 9G:
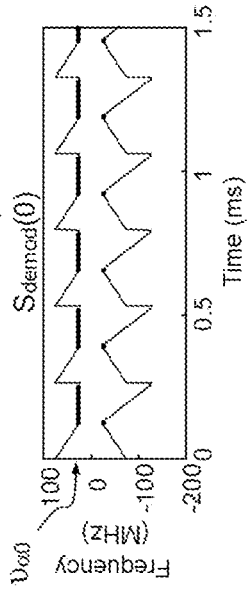

FIGS. 9f and 9g illustrate the variation as a function of time in the demodulated signal $S_{demod}(0)$ and $S_{demod}(1)$, respectively.

It may be seen that the plateaus reappear, even at longer distance. The detected characteristic frequencies are $v_{\alpha 0}=27.6$ MHz and $v_{\alpha 1}=75.6$ MHz. There are almost no peaks left at $-27.6$ MHz and $-75.6$ MHz Thus, the proposed method avoids testing all the distance boxes (computationally expensive solution) and allows, via a simple modulation/demodulation operation, the distance of the target to be determined, provided that the power of the laser remains sufficient. The peaks generated from the backscattered signal reappear, thus allowing a method that is no longer limited by the processing of the signal, but solely by the power of the laser, to be obtained.

The computation is performed on the basis of the digitized beat signal Sb(t) as time passes.

Mathematically, step 501 of modulating with the frequency $$f_{mod}(t) = f_{OL}(t) - f0$$

amounts to multiplying the signal Sb(t) by a complex number C(t), which is also digitized, equal to:

$$C = \exp[2j\pi \int_0^t (f_{OL}(u) - f_0) du] = \exp[2j\pi \int_0^t (f_{mod}(u)) du]$$

That is, $S_{mod}(t) = C * Sb(t)$ f0: frequency of the laser without modulation $f_{OL}$: frequency of the local oscillator Next, in the demodulating step 502, each demodulation amounts to multiplying the signal $S_{mod}(t)$ by a complex number Ci(t) defined as follows:

$$C_i = \exp\left\{-2j\pi \int_0^t \left[\alpha_i \cdot \left(u - \left(\frac{n}{2}g_i(u) + \text{floor}\left(\frac{i+1}{2}\right)\right) * \frac{T_{FO}}{2}\right)\right] du\right\}$$

Where i is the index of the slope $\alpha i$, with i varying from 0 to n–1, $T_{FO}$ is the period of the waveform, $$g_i(u) = \text{floor}\left(\frac{4u}{nT_{FO}} - \frac{i}{n}\right)$$

floor being the round-down function (for example floor(2.6)=2 and floor(–3.2)=–4)

That is, in the end:

$$S_{demod/i}(t) = S_b(t).\exp$$
$$\left\{2j\pi \int_0^t \left[f_{OL}(u) - f_0 - \alpha_i \cdot \left(u - \left(\frac{n}{2}g_i(u) + \text{floor}\left(\frac{i+1}{2}\right)\right) * \frac{T_{FO}}{2}\right)\right]du\right\}$$

$$S_{demod/i}(t) = S_b(t).\exp$$
$$\left\{2j\pi \int_0^t \left[f_{mod}(u) - \alpha_i \cdot \left(u - \left(\frac{n}{2}g_i(u) + \text{floor}\left(\frac{i+1}{2}\right)\right) * \frac{T_{FO}}{2}\right)\right]du\right\}$$

The portion $\alpha_i u$ corresponds to the linear portion, the portion $n/2 \cdot g_i(u) \cdot T_{FO}/2$ expresses the regular return to zero and the time shift, and the portion $\text{floor}(i+1/2)*T_{FO}/2$ corresponds to a shift in frequency allowing a situation in which the velocity and distance of the target are zero to be shifted to zero frequency. The latter shift in frequency compensates for a parasitic effect generated by the time shift associated with the function $g_i(u)$.

It will be noted that if the apexes of the waveform are rounded, these equations remain valid because this rounded shape is taken into account in the definition of $S_{mod}(t)$.

Step 503 of obtaining the spectral densities SP(i) is typically carried out by frequency transform, by taking the square of the modulus of the Fourier transform of the temporal signal $S_{demod/i}(t)$:

$$SP_i(\nu) = \left|FFT\{S_{demod/i}(t)\}\right|^2 = \left|FFT\left\{S_b(t).\exp\left[2j\pi \int_0^t (f_{mod}(u) - \alpha_i \cdot \left(u - \left(\frac{n}{2}g_i(u) + \text{floor}\left(\frac{i+1}{2}\right)\right) * \frac{T_{FO}}{2}\right))du\right]\right\}\right|^2$$

Preferably, the step 503 of determining each spectral density comprises substeps of:

determining a plurality of elementary spectral densities for a plurality of time intervals $\delta t$ shorter than or equal to the modulation period $T_{FO}$, determining each spectral density of index i SP(i) from the sum of the plurality of elementary spectral densities.

Preferably, each elementary spectral density is determined by fast Fourier transform (FFT).

Specifically, to simplify the processing, the Fourier transforms carried out during the period of the waveform may be directly summed (in power). A non-coherent accumulation of elementary spectral densities, which are then averaged, is therefore carried out.

This operation allows fast computations to be performed, each elementary spectral density being computed over a short time $\delta t$.

For example, for a sampling frequency of 125 MHz and a period $T_{FO}$ of 500 μs, carrying out a plurality of FFT computations in a $\delta t$ of 30 μs (corresponding to 4000 points) is much more effective than carrying out a computation over the total duration of $T_{FO}$ (too many points).

In addition, carrying out an average over a certain number of FFTs during a period $T_{FO}$ allows the signal-to-noise ratio of $SP_i(\nu)$ to be improved without loss of information, by judiciously choosing the instants at which the signal is accumulated. Specifically, the noise is generally limited by photon noise. The signal and the noise have a chi2 statistical distribution and, therefore, the signal-to-noise ratio decreases as $1/\sqrt{N}$ where N is the number of spectral densities averaged. FIGS. 8*a* and 8*b* correspond to an average of the spectral densities SP(0) and SP(1) carried out over several hundred FFTs (N=864).

The signal described by the instantaneous frequencies between the plateaus has a power proportional to the power of the signal concentrated in the frequency plateaus, but it is distributed over a clearly higher number of spectral channels. After time/frequency analysis, this signal is therefore diluted in the analysis band and leads:

at short distance to additional noise that decreases the signal-to-noise ratio (SNR). This decrease is however not important since at short distance the SNR is high. According to one embodiment, if it is desired to avoid this decrease, a step of searching time ranges leading to a frequency plateau is added to guarantee a maximum SNR.

at long distance (for a lower SNR), the additional noise remains less than the detection noise (in particular the photon noise of the local oscillator), but decreasing accumulation time to only those instants at which the signal is present allows the detection noise to be decreased.

Moreover, carrying out an average over a certain number of FFT during a period $T_{FO}$ allows the duration of a Fourier transform to be set to the coherence time of the target (which in particular depends on the movements of this target), this also optimizing the signal-to-noise ratio.

The calculated spectral density is preferably equal to the average of the elementary spectral densities, in order to always obtain normalized numerical values.

From a practical point of view, the modulation/demodulation computations, then the FFT computation and the computation of the square of the modulus are carried out as the beat signal is digitized, in real time. Next, at the end of a certain accumulation time, the spectral densities SP(i) are obtained by carrying out the average of the accumulated elementary spectral densities (see FIG. 14 below).

The invention applies to any value of n higher than or equal to 2. FIGS. 7*a*-7*g* illustrate the method applied for n=2. To remove ambiguities associated with any overlaps, a waveform with 4 frequency slopes $\alpha 0$, $\alpha 1$, $\alpha 2$, $\alpha 3$ is preferably used. Specifically, the determination of 4 characteristic frequencies leads to a system of 4 equations, with 2 unknowns, v and d. This allows a redundancy to be obtained and therefore one of the equations to be used to remove ambiguities associated with any spectral overlaps and another as a confidence parameter. This confidence parameter may for example be the residue of the inversion between the frequencies $\nu_{\alpha i}$ and the distance and radial velocity. This inversion may be obtained by a least-squares technique, optionally an iteratively-reweighted-least-squares (IRLS) technique.

Just like FIGS. 7*a*-7*g* for the case of a 2-slope waveform, the top portion of FIG. 10 illustrates the variation over time in the frequencies $f_{OL}(t)$ and $f_s(t)$, the average optical frequency f0 having been subtracted for greater clarity. The bottom portion of FIG. 10 illustrates the variation over time in $f_s-f_{OL}$ for the 4-slope case. It may be seen in the bottom portion of FIG. 10 that this variation in frequency over time contains 4 plateaus corresponding to the 4 characteristic frequencies."

Just like FIGS. 7*a*-7*g* for the case of a 2-slope waveform, FIG. 11*b* illustrates the two frequency components of the lidar beat signal Sb, $f_s-f_{OL}$ and $f_{OL}-f_s$, and FIG. 11*c* illustrates the variation as a function of time in the frequency of the obtained modulated signal Smog for a waveform comprising 4 slopes. FIGS. 12*a*, 12*b*, 12*c* and 12*d* illustrate the variation as a function of time in the demodulation frequencies $f_{mod}(0)$ (for slope α0) and $f_{mod}(1)$ (for slope α1), $f_{mod}(2)$ (for slope α2) and $f_{mod}(3)$ (for slope α3), respectively, and FIGS. 12e, 12f, 12g and 12h illustrate the variation as a function of time in the demodulated signal $S_{demod}(0)$, $S_{demod}(1)$, $S_{demod}(2)$ and $S_{demod}(3)$, respectively.

For 4 slopes, $f_{mod}(0)$ is not shifted (see FIG. 12a), $f_{mod}(1)$ is shifted by $T_{FO}/4$ (see FIG. 12b), $f_{mod}(2)$ is shifted by $T_{FO}/2$ (see FIG. 12c), and $f_{mod}(3)$ is shifted by $¾·T_{FO}$ (see FIG. 12d).

FIGS. 10 and 11 correspond to the case of a target located at 12 km, moving at 40 m/s, the frequency $f_{mod}$ having the following slope values (laser of optical frequency f0=1.55 μm):
α0=0.2 MHz/μs
α1=−0.2 MHz/μs
α2=0.3 MHz/μs
α3=−0.3 MHz/μs By transform in the frequency domain, the characteristic frequencies (longest plateaus) are detected: 35.6 MHz (α0), 67.6 MHz (α1), 27.6 MHz ($α_2$) and 75.6 MHz ($α_3$)

There are also weaker peaks at the opposite frequencies.

The invention also relates to a coherent lidar system (illustrated in FIG. 13) comprising:
a coherent source L that is periodically modulated in frequency,
a device DE for emitting an optical signal generated by the coherent source and a device DR for receiving a signal backscattered by a target T that is illuminated by the lidar,
a photodetector D configured to generate a beat signal Sb from the interference between an optical signal referred to as the local oscillator, having a local-oscillator frequency $f_{OL}(t)$, and the backscattered optical signal, the local-oscillator frequency $f_{OL}(t)$ consisting of the sum of an average value f0 and of a modulation frequency $f_{mod}(t)$ that is generated by modulating the source, the modulation frequency being periodic with a modulation period $T_{FO}$, each period comprising n linear portions having n frequency slopes αi, respectively, n being higher than or equal to 2, i varying from 0 to n−1,
a processing unit UT configured to:
digitize the beat signal,
modulate in a complex way the beat signal Sb with the modulation frequency $f_{mod}$ in order to obtain a modulated signal $S_{mod}$,
demodulate in a complex way the modulated signal $S_{mod}$ with n demodulation frequencies $f_{demod}(i)$ each having a single slope equal to the respective frequency slope αi of the modulation frequency in order to obtain n demodulated signals $S_{demod}(i)$,
determine n spectral densities SP(i) of the n demodulated signals,
determine n characteristic frequencies $v_{αi}$ corresponding to the maximum of the n spectral densities SP(i), respectively,
determine information on the velocity v and information on the distance d of the target T from said n characteristic frequencies $v_{αi}$.

Advantageously, the processing unit UT is furthermore configured to determine, for each spectral density, a plurality of elementary spectral densities for a plurality of time intervals shorter than or equal to the modulation period $T_{FO}$, the spectral density SP(i) being determined from the sum of the plurality of elementary spectral densities. Preferably each elementary spectral density is determined by fast Fourier transform (FFT). Preferably, the spectral density is equal to an average of the elementary spectral densities.

Preferably, the processing unit UT comprises n channels, one channel per slope, each channel operating in parallel with the others and being configured to determine the associated frequency. Specifically, the modulation and demodulation may be carried out simultaneously, thus leading to a low computational cost (consisting of a single complex multiplication).

An example of implementation of a parallel 4-channel (4-slope) architecture in the processing unit UT is illustrated in FIG. 14.

The beat signal Sb is digitized using an analog/digital converter ADC (for example a 14 bit, 125 MHz converter) then optionally filtered by a frequency filter F. The digitized and filtered signal is then distributed between the 4 channels. Each channel operates in parallel with the others and implements the same processing chain. Only the value of the demodulation frequency $f_{demod}(i)$ (and its time shift) is different from one chain to the next.

The module 2 allows the amplitude and phase of the modulation and demodulation functions C and $f_{mod}(i)$ to be defined. The product of these functions is then evaluated in the module 3.

The module 4 allows the complex multiplication of the digitized beat signal Sb and the function computed in the module 3 to be carried out (product of the modulation function C and the demodulation function $f_{mod}(i)$).

The module 5 carries out the complex fast Fourier transforms (FFTs). The module 6 computes the squared norm of the Fourier transforms.

The module 7 sums the spectral power densities during a time set by the characteristics delivered by the module 12 (duration, repetition rate, etc.). This result is transferred to a buffer 8 before being transferred via a TCP server 9 to and exploited in a second portion of the signal processing that may be carried out more slowly. This second portion, module 11 in FIG. 14, allows the detection of peaks and the evaluation of the frequencies to be carried out and computes v and d while taking into account all of these characteristic frequencies. This step may, for example, be carried out using the least-squares technique or the iteratively-reweighted-least-squares (IRLS) technique, such techniques being known in the literature.

The invention also relates to a computer-program product comprising code instructions allowing the steps of the processing method according to the invention to be carried out.

In the various variant embodiments of the system according to the invention, the computational modules may be arranged in various architectures, and in particular each step of the method may be implemented by a separate module or in contrast all of the steps may be grouped together within a single computational module.

Each of the computational modules that the system according to the invention includes may be produced in software and/or hardware form. Each module may in particular consist of a processor and a memory. The processor may be a generic processor, a specific processor, an application-specific integrated circuit (ASIC) or a field-programmable gate array (FPGA).

The invention claimed is:

1. A method for processing a signal generated by a coherent lidar comprising a coherent source that is periodically modulated in frequency,
a beat signal being generated by a photodetector from the interference between an optical signal referred to as the local oscillator, having a local-oscillator frequency ($f_{OL}(t)$), and an optical signal backscattered by a target illuminated by the lidar, said beat signal being digitized, the local-oscillator frequency ($f_{OL}(t)$) consisting of the sum of an average value and of a modulation frequency ($f_{mod}(t)$) that is generated by modulating the source, the modulation frequency being periodic with a modulation period ($T_{FO}$), each period comprising n linear portions having n frequency slopes ($\alpha i$), respectively, n being higher than or equal to 2, the method comprising steps of:

modulating in a complex way the beat signal with the modulation frequency ($f_{mod}$) in order to obtain a modulated signal ($S_{mod}$), demodulating in a complex way the modulated signal ($S_{mod}$) with n demodulation frequencies ($f_{demod}(i)$) each having a single slope equal to the respective frequency slope ($\alpha i$) of the modulation frequency ($f_{mod}$), in order to obtain n demodulated signals ($S_{demod}(i)$), determining n spectral densities ($SP(i)$) of the n demodulated signals ($S_{demod}(i)$), determining n characteristic frequencies ($v_{\alpha i}$) corresponding to the maximum of the n spectral densities ($SP(i)$), respectively, determining information on the velocity and information on the distance of the target from said n characteristic frequencies ($v_{\alpha i}$).

2. The method as claimed in claim 1, wherein the step of determining each spectral density comprises substeps of:

determining a plurality of elementary spectral densities for a plurality of time intervals shorter than or equal to the modulation period ($T_{FO}$), determining said spectral density ($SP(i)$) from the sum of the plurality of elementary spectral densities.

3. The method as claimed in claim 2, wherein each elementary spectral density is determined by fast Fourier transform, and wherein the spectral density is equal to an average of the elementary spectral densities.

4. The method as claimed in claim 1, wherein each demodulation frequency ($f_{demod}(i)$) is periodic with the modulation period ($T_{FO}$).

5. The method as claimed in claim 4, wherein the frequency slopes ($\alpha i$) are indexed by an index i varying from 0 to n−1 and wherein each demodulation frequency ($f_{demod}(i)$) having a slope of index i is temporally shifted with respect to the modulation frequency ($f_{mod}$) by a shift time ($tdi$) that is dependent on i, on n and on the modulation period ($T_{FO}$).

6. The method as claimed in claim 1, wherein the waveform comprises 4 slopes $\alpha 0, \alpha 1, \alpha 2, \alpha 3$ with:

$\alpha 1 = -\alpha 0$ and $\alpha 3 = -\alpha 2$

7. A coherent lidar system comprising:

a coherent source that is periodically modulated in frequency, a lidar transmitting device for emitting an optical signal generated by the coherent source and a lidar receiving device for receiving a signal backscattered by a target that is illuminated by the lidar, a photodetector configured to generate a beat signal from the interference between an optical signal referred to as the local oscillator, having a local-oscillator frequency ($f_{OL}(t)$), and the backscattered optical signal, the local-oscillator frequency ($f_{OL}(t)$) consisting of the sum of an average value and of a modulation frequency ($f_{mod}(t)$) that is generated by modulating the source, the modulation frequency being periodic with a modulation period ($T_{FO}$), each period comprising n linear portions having n frequency slopes ($\alpha i$), respectively, n being higher than or equal to 2, a processing unit configured to:

digitize the beat signal, modulate in a complex way the beat signal with the modulation frequency ($f_{mod}$) in order to obtain a modulated signal ($S_{mod}$), demodulate in a complex way the modulated signal ($S_{mod}$) with n demodulation frequencies ($f_{demod}(i)$) each having a single slope equal to the respective frequency slope ($\alpha i$) of the modulation frequency in order to obtain n demodulated signals ($S_{demod}(i)$), determine n spectral densities ($SP(i)$) of the n demodulated signals, determine n characteristic frequencies ($v_{\alpha i}$) corresponding to the maximum of the n spectral densities ($SP(i)$), respectively, determine information on the velocity and information on the distance of the target from said n characteristic frequencies ($v_{\alpha i}$).

8. The lidar system as claimed in claim 7, wherein the processing unit is furthermore configured to determine, for each spectral density, a plurality of elementary spectral densities for a plurality of time intervals shorter than or equal to the modulation period ($T_{FO}$), said spectral density ($SP(i)$) being determined from the sum of the plurality of elementary spectral densities.

9. The lidar system as claimed in claim 8, wherein each elementary spectral density is determined by fast Fourier transform, and wherein the spectral density is equal to an average of the elementary spectral densities.

10. The lidar system as claimed in claim 7, wherein the processing unit comprises n channels, one channel per slope, each channel operating in parallel with the others and being configured to determine the associated frequency.

11. A computer-program product, said computer program comprising code instructions allowing the steps of the processing method as claimed in claim 1 to be carried out.

* * * * *